Feb. 26, 1963 K. W. SWEETON 3,078,596

CIRCUIT ASSEMBLY BOARD

Filed Nov. 21, 1960

Kenneth W. Sweeton
INVENTOR.

BY Eugene D. Farley
Atty.

United States Patent Office 3,078,596 Patented Feb. 26, 1963

3,078,596
CIRCUIT ASSEMBLY BOARD
Kenneth W. Sweeton, 1612 Teresa Lane, Alamogordo, N. Mex.
Filed Nov. 21, 1960, Ser. No. 70,769
3 Claims. (Cl. 35—19)

This invention relates to a circuit assembly board and more particularly to an assembly board designed for demonstration, educational, or experimental purposes.

A primary object of the present invention is to provide a circuit assembly board of the type described having means facilitating rapid and easy assembly of electrical or electronic circuitry.

Another object is to provide a circuit assembly board employing novel structure for arranging desired components.

Another object is to provide a circuit assembly board employing a novel system of marking for identifying the various components as well as tracing the circuitry included therein.

Still another object is to provide an improved peg and lug structure for accomplishing rapid and efficient mechanical connection of circuit components to an insulating board as well as an electrical connection to each other in the circuit.

It is still another object of the present invention to provide a novel peg structure which is adapted to be connected to lugs on circuit components and which has means for the reception of an instrument probe for the ready metering of voltages or currents or to permit the reception of signalling means at appropriate points in the circuit.

It is another object to provide a circuit assembly board employing means which permits repeated connection of various components and leads without damage to these elements, thereby producing a durable and long lasting assembly system.

Briefly stated, the present assembly board comprises a supporting panel provided with selectively located apertures for the reception of peg members. The peg members are arranged to connect mechanically various component lugs as well as leads to the supporting board and also to connect electrically various of the components and leads in a circuit. The components employed in the present system are each marked in a manner to identify them, as by appropriate symbol or name, and also, are marked exteriorly with their wiring diagram so that the circuitry can be illustrated or readily followed through the system. The peg members employed for mechanically and electrically connecting the various elements also employ means adapted to receive probe portions of metering or signalling means.

The manner in which the foregoing and other objects of the invention are accomplished will be apparent from the accompanying specification and claims considered together with the accompanying drawings, wherein like numerals of reference indicate like parts, and wherein:

Figures 1, 2, 3, 4, 5, 6, 7, 8, 9, 10, 11:
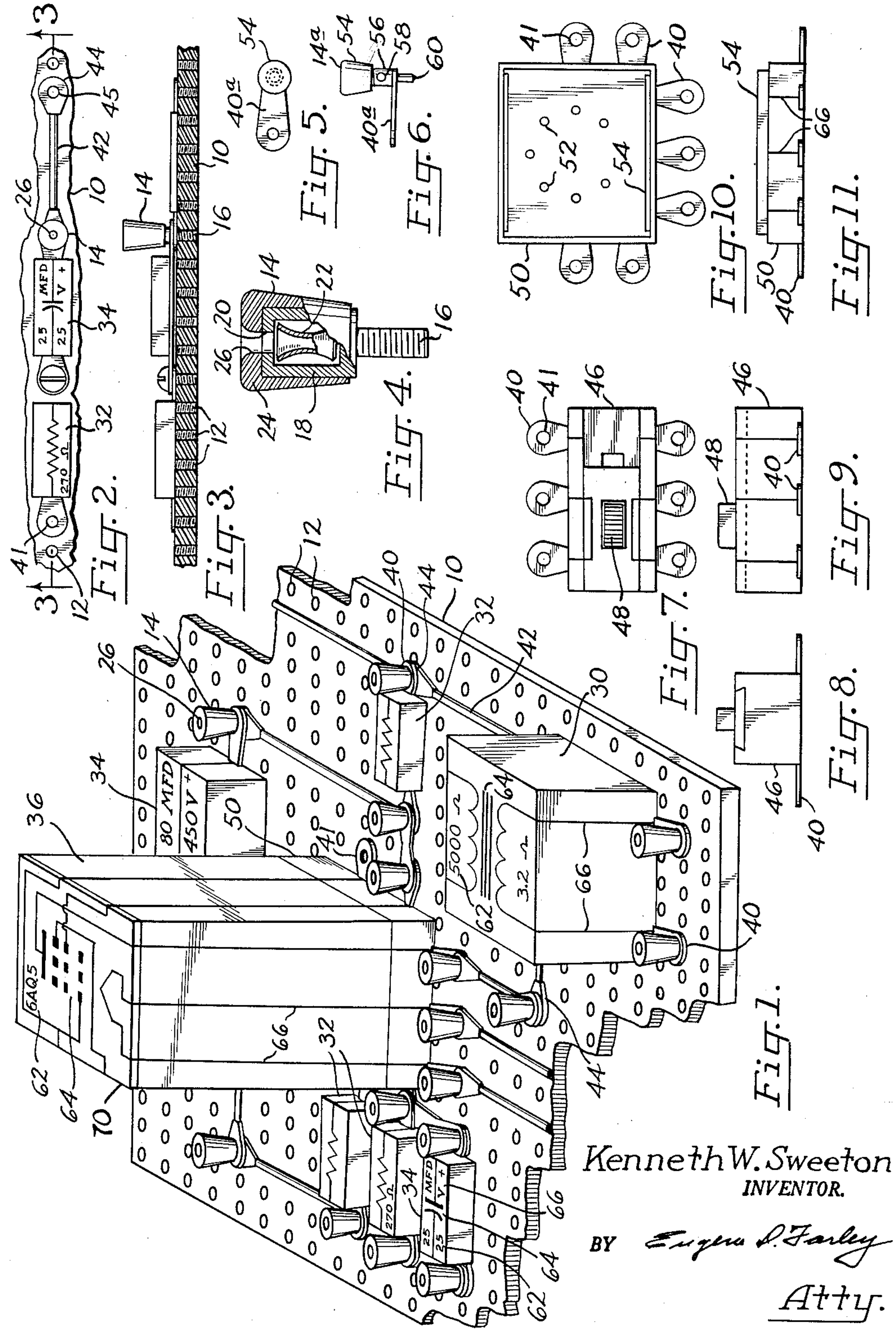
FIGURE 1 is a perspective view of a circuit board assembly employing the principles of the present invention.
FIGURE 2 is a fragmentary plan view illustrating a pair of circuit components and their mounted relation on a supporting panel.
FIGURE 3 is a sectional view taken on the line 3—3 of FIGURE 2 showing a preferred manner of connecting circuit components to the supporting board.
FIGURE 4 is an elevational view with parts broken away showing peg structure for connecting components together and to the supporting board.
FIGURES 5 and 6 are top plane and elevational views, respectively, of a modified form of peg structure.
FIGURES 7, 8 and 9 are top plan, end and side elevational views, respectively, of a circuit component, comprising a switch mechanism.
FIGURES 10 and 11 are plan and side elevational views, respectively, of another circuit component, comprising a tube mounting base.

Referring now in particular to the drawings and first to FIGURE 1, there is illustrated an assemblage of circuit components, to be described, mounted on a supporting panel 10 of insulating material such as fiberboard, plastic, or other well known panels possessing the desired properties of non-conductivity and rigidity. Panel 10 is provided with apertures 12 which preferably are arranged in equally spaced rows in both directions of the panel.

As best seen in FIGURE 3, apertures 12 have threaded side walls for engagement by pegs 14, which as will be seen are employed to mount various circuit components on the supporting panel 10 and also to connect these components together electrically in a circuit, the pegs having a threaded shank 16 engageable with the apertures 12 for the stated purpose. Apertures 12 may have interiorly threaded walls as described, or may have interiorly threaded inserts supported therein.

Referring now to FIGURE 4, the pegs 14 have a metallic housing portion 18. Housing 18 has an aperture 20 in its top wall, and contained in the housing are fingers 22 of springy metal which are suitably curved to grip frictionally a probe of an instrument for a purpose to be described hereinafter, the probe, when plugged in the peg causing the fingers to spread into pressure contact with the inner wall of housing whereby electrical connection is established between the housing and the probe.

Peg 14 preferably carries an insulating cap 24 which extends around the sides and top of the peg. Such cap has a top opening 26 in registry with aperture 20 in the housing 18.

By means of the peg 14 and the supporting panel 10, various circuits are adapted to be assembled on the panel employing components having a novel structure for use therewith. FIGURE 1 illustrates an assemblage of components making up a typical audio power amplifier circuit, although it is to be understood that other circuits as desired may be assembled for demonstrational, educational, or experimental purposes.

The circuit illustrated employs encased components comprising a transformer 30, resistors 32, capacitors 34, and a tube 36. Each of these components has laterally projecting metallic lugs 40 connected to the internal wiring of the components and provided with apertures 41. Various components of the circuit are adapted to be connected by leads or connectors 42 having end metallic lugs 44 engageable with the lugs 40 in juxtaposition and electrically connected thereto by the pegs 14 which clamp these elements together upon being threaded tightly into apertures 12 in the supporting panel. Lugs 44 have apertures 45 for receiving the pegs 14. Connectors 42 may comprise bare flat metal strips, insulated metal strips, bare wires, or insulated wire.

In the manufacture of the various circuit components, such as the transformer, resistors, capacitors, and so forth, it will be apparent that suitable connection of wire leads from their internal wiring is made to lugs 40. The dimensioning of the components and the positioning of the lugs is such that the spacing between the lugs is adapted to match the spacing of the apertures 12 in the supporting panel so that the lugs will register with such apertures. Also, in a preferred arrangement and to form a neat layout connectors 42 are of predetermined length whereby the holes in opposite ends thereof match the spacing of the holes in the panel.

With particular reference to FIGURES 7–9 there is illustrated a switch 46 having a sliding selector button 48. This switch has lugs 40 which are connected to internal wiring of the switch and which project outwardly so as to be connected to other elements in the system.

FIGURES 10 and 11 illustrate a tube base 50 having lugs 40 suitably connected electrically to sockets 52 adapted to receive the prongs of a tube. Base 50 has upwardly projecting flanges 54 to which the tube housing 36 may be fastened, as for example by friction engagement of the flanges with the inner walls of the housing. The housing 36 may thus be readily detached from the base 50 for replacement of the tube.

It is to be understood that the base 50 may be utilized for purposes other than that of supporting a tube. That is, this base may have different socket and lug combinations to fit other plug-in components such as transistors, microphone plugs, and so forth.

FIGURES 5 and 6 illustrate a modified form of peg, designated by the numeral 14*a*. In this embodiment a knob 54, preferably an insulated knob, is threadedly mounted on an upwardly projecting shank 56 comprising an integral part of a lug 40*a*. Shank 56 is apertured at 58 and has a downwardly projecting prong 60 of reduced diameter. The peg 14*a* is useful in the connection of components to the system or the testing of components which have lead wires rather than lugs. For such purpose the lead wire is inserted in the aperture 58 and the knob 54 screwed down against the wire to anchor it in place, whereby electrical connection is established between the lug and the component from which the lead wire extends. Prong 60 is of a size to be inserted in an aperture 12 in the panel 10 for supporting such peg on the panel.

Also comprising a part of the present invention is the provision of identifying symbols on each component as well as a schematic wiring diagram of the internal wiring of the component. More particularly, each of the casings for the circuit components bears identifying symbols or values 62 of the components and furthermore bears the wiring diagram 64 thereof, with lead lines 66 of the wiring diagram terminating at the lugs 40. By this arrangement a schematic diagram of all wires in the circuit is visible and circuits thus readily can be identified and traced.

Furthermore, by means of the identification of the components and their wiring, together with the peg and lug arrangement facilitating rapid and easy assembly and disassembly, the system is particularly useful for demonstrational, educational, and for experimental purposes. The structure of pegs 14 makes it possible to take voltage or current readings in any desired place in the circuit merely by inserting the probes of an instrument in the desired pegs.

Tube cover 36 is provided with a top plate or card 70. Such plate is removably attached to the top of the tube cover by any suitable means, such as by pressure sensitive glue, and thus plates having different wiring diagrams 64 may be substituted one for the other. Thus, instead of having a different tube cover for each type of tube, plates 70 merely may be substituted in appropriate cases.

The present system eliminates soldering or any other tedious method of attachment of leads to the components. With the arrangement set forth herein, the pegs 14 serve doubly to connect lugs together as well as to secure them to the supporting panel. In addition, no appreciable damage is done to the leads whereby the circuit can be assembled and disassembled repeatedly without wearing out or damaging the parts.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An assembly board for assembling a circuit comprising a supporting panel having a plurality of sockets therein, electrical components seated on the panel having a top wall and side walls, lug means on the electrical components projecting laterally beyond the sides of the components adjacent the bottom thereof and being electrically connected to the internal circuitry of the components, the electrical components having a wiring diagram of their circuitry printed on the exterior surface thereof and including printed lead line designations extending vertically on the side walls between the wiring diagram and the point of projection of the lug means, and fasteners engageable removably with the lug means and the sockets in the supporting panel for clamping together on the surface of the supporting panel the lug means of two or more components and establishing electrical connection of the components.

2. The assembly board of claim 1 wherein one of the electrical components comprises a tube and tube cover therefor, and a top plate removably mounted on the tube cover, the top plate having the tube wiring diagram printed thereon and the wiring diagram having lead line designations joining with the upper end of the vertical lead line designations on the side walls of the tube cover.

3. The assembly board of claim 1 wherein one of the electrical components comprises a removable tube and removable tube cover therefor, a tube base having sockets for removably receiving the tube, means on the tube base removably supporting the tube cover, and a top plate removably mounted on the tube cover, the top plate having the tube wiring diagram printed thereon and the wiring diagram having lead line designations joining with the upper end of the vertical lead line designations on the side walls of the tube cover.

References Cited in the file of this patent

UNITED STATES PATENTS

| | | |
|---|---|---|
| 2,374,800 | Bohlke | May 1, 1945 |
| 2,390,706 | Hearon | Dec. 11, 1945 |
| 2,477,653 | Roane | Aug. 2, 1949 |
| 2,568,535 | Ballard | Sept. 18, 1951 |
| 2,592,552 | De Florez et al. | Apr. 15, 1952 |
| 2,857,558 | Fiske | Oct. 21, 1958 |
| 2,878,587 | Jubenville | Mar. 24, 1959 |

FOREIGN PATENTS

| | | |
|---|---|---|
| 531,455 | Great Britain | Jan. 3, 1941 |
| 549,667 | Italy | Oct. 16, 1956 |
| 932,375 | France | Nov. 24, 1947 |
| 1,012,846 | France | July 17, 1952 |